May 2, 1933. G. S. SCOTT 1,906,425
LEVER OPERATING REEL
Filed Feb. 13, 1932
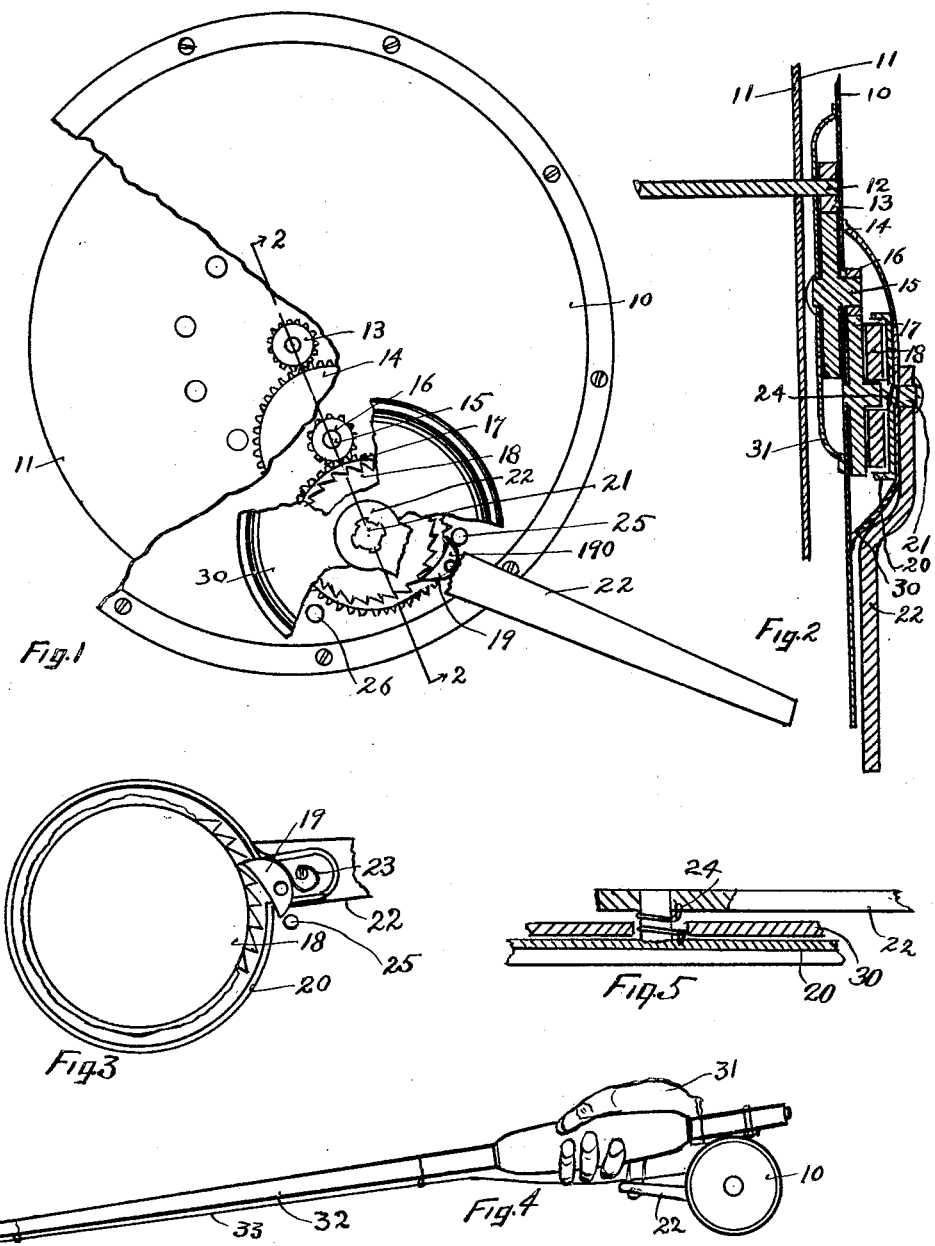
George S. Scott, Inventor
By Francis C. Huebner, Attorney Patented May 2, 1933

1,906,425

UNITED STATES PATENT OFFICE

GEORGE S. SCOTT, OF MODESTO, CALIFORNIA

LEVER OPERATING REEL

Application filed February 13, 1932. Serial No. 592,740.

My invention relates to a fishing reel, and more specifically to a reel of that character which will be operated at will mechanically, and rapidly wind the line thereon.

The object I have accomplished is the construction of a reel which will revolve at a high rate of speed by the movement of a lever and which can be operated by a finger on the hand holding the fishing rod. Other objects are the simplicity of construction, and the locking the spool on the reel by a slight movement of the hand. Other objects will be hereinafter disclosed.

In the drawing accompanying this specification, Fig. 1 shows a side view of the reel with parts cut away to show interior mechanism of the device. Fig. 2 is a sectional view of the device along sectional line 2—2 in Fig. 1. Fig. 3 is an enlarged fractional view of the underside of the pawl and ratchet, showing spring means for normally holding the pawl engaged with the ratchet. Fig. 4 shows the reel attached to a fishing pole and the relative position of the hand in using it. Fig. 5 is an enlarged part sectional view showing spring means for returning the handle to a normal position.

Referring to the drawing, the outside shell of the reel is designated 10. A spool 11 is adapted to be retained in the shell and to rotate therein. Axle 12 attached to the spool terminates at one end with pinion 13 which is enmeshed with a larger gear 14. Gear 14 is rotatingly mounted on the inside of shell 10. Shaft 15, attached to gear 14, is also attached to or formed integral with an auxiliary pinion 16. Pinion 16 is enmeshed with a larger driving gear 17, which is also rotatingly mounted or journaled on shell 10. Attached to a face of driving gear 17 or formed integral therewith is ratchet 18.

Pawl 19 is pivotally attached to pawl support 20. Pawl support 20 is rotatively mounted concentric with ratchet 18 and is adapted to cooperate therewith. Extending outward from pawl support 20 is spline 21 formed so that when lever 22 is assembled therewith the lever interlocks with the spline. A post can be substituted for the spline if desired but I prefer a spline so that when the reel is assembled with the rod, the lever can be adjusted thereon to be nearer the rod or farther therefrom, and thus adjusted for the use of the user of my reel.

A spring 23 normally holds pawl 19 in engagement with ratchet 18 and spring 24 normally returns lever 22 to engagement with stop 25. As shown in the drawing, spring 23 is a curved spring anchored at one end to the pawl support, with the free end engaging the pawl. Spring 24 is preferably in the form of a coil which encircles spline 21, one end of the spring being anchored to the housing 10 and the other end being anchored to the lever or to the pawl support. Pawl 19 is constructed so that when lever 22 is at the fixed normal stopping place pawl 19 will be released from the ratchet, and spool 11 can readily rotate to unwind the line therefrom. This is accomplished by forming the pawl with a dog 190 at the end opposite the end adapted to engage the ratchet, so that when spring 24 returns lever 22 to its normal position the dog 190 engages post 25 and moves the pawl in a direction adapted to disengage the pawl with the ratchet. As spring 24 is stronger than spring 23 when lever 22 is held at the starting position by spring 24, the engagement of dog 190 with post 25 will disengage the pawl with the ratchet.

Post 26 is attached to shell 10 and is positioned to limit the movement of lever 22 in the forward direction.

By reference to Fig. 4 the use of my reel can be seen. The gear ratio between the spool and lever 22 is high, preferably about 8 to 1, and the movement of lever 22 gives the reel a quick succession of revolutions, thus quickly winding up the line when desired. This movement can be accomplished by a finger of the hand holding the fishing rod or pole which finger can manipulate lever 22 to move it forward to wind the line, or to hold it in a forward position when it is desired to hold the line from further unwinding. When it is desired to have a free line for casting, lever 22 and dog 190 should be permitted to rest against post 25.

It is noted that in casting, the spool can rotate freely unless the lever is held so that extension 190 is disengaged from post 25, and if it is desired to lock the spool so that it cannot rotate, holding lever 22 so that extension 190 will not engage post 25, will accomplish that purpose.

A housing 30 can be adapted to cover the gears, ratchet, pawl, and stops, with spline 21 extending through said housing for attaching lever 22 thereto.

It is also noted that when it is desired to wind up the line rapidly, the lever can be given a sudden jerk which will rapidly revolve the spool and thus give it momentum, to wind more line than if the lever were operated slowly. The lever can then be released, spring 24 will return it to the initial position and it can be quickly raised again. This repeated raising and lowering the lever winds the line as rapidly as desired. If it is desired to wind up a short length of string only the lever can be raised slowly. In Fig. 4 the fishing rod is designated 32, the hand 31 is holding the pole with the little finger engaged with lever 22, and the line being wound is shown as 33.

Having described my invention, I claim:

1. In combination with a reel having a spool adapted for winding a line thereon, a series of gears consisting of a driving gear and driven gears adopted to rotate the spool at a higher rate of speed than the speed of the driving gear, pawl and ratchet means for rotating the driving gear, a lever adapted to operate said pawl and ratchet, yielding means adapted to normally hold the pawl in engagement with the ratchet, and means adapted to release the pawl from the ratchet when the lever has been moved to a predetermined position in its path of travel.

2. In combination with a reel having a spool adapted for winding a line thereon, a series of gears consisting of driving gears and driven gears adapted to rotate the spool at a higher rate of speed than the speed of the driving gear, ratchet means for rotating the driving gear, a lever adapted to operate said ratchet, yielding means adapted to normally hold the pawl in position for engagement with the ratchet, and means independent of the lever adapted to release said pawl from the ratchet, and to hold said pawl in disengagement with said ratchet when the said lever is normally at rest in a predetermined position in its path of travel.

3. In combination with a reel having a spool adapted for winding a line thereon, a series of gears consisting of driving gears and driven gears adapted to rotate the spool at a higher rate of speed than the speed of the driving gear, pawl and ratchet means for rotating the driving gear, a lever adapted to actuate said ratchet, stops for limiting the movement of the lever, yielding means adapted to normally hold the lever adjacent to the stop at the end of travel of the backward movement of said lever, one of said stops being adapted to release the pawl from engagement with the ratchet.

4. In combination with a reel having a spool adapted for winding a line thereon, a series of gears consisting of driving gears and driven gears adapted to rotate the spool at a higher rate of speed than the speed of the driving gear, pawl and ratchet means for rotating the driving gear, a lever adapted to actuate said ratchet, stops for limiting the movement of the lever, yielding means adapted to normally hold the lever adjacent to the stop at the end of travel of the backward movement of said lever, said pawl having a cooperating spring adapted to normally hold the pawl in engagement with the ratchet, the pawl having a dog thereon adapted to engage the said stop, said dog being adapted on the engagement with the stop to release the pawl from engagement with the ratchet.

GEORGE S. SCOTT.